UNITED STATES PATENT OFFICE.

ARTHUR WARNER, OF WESTBOURNE CRESCENT, HYDE PARK, ENGLAND.

IMPROVEMENT IN REFINING CAST-IRON.

Specification forming part of Letters Patent No. 170,420, dated November 23, 1875; application filed August 27, 1874.

*To all whom it may concern:*

Be it known that I, ARTHUR WARNER, of Westbourne Crescent, Hyde Park, in the county of Middlesex, England, have invented a certain Improvement in the Manufacture of Iron, of which the following is a specification:

My invention relates to an improved mode of treating and purifying iron by causing refining or purifying agents, such as are hereinafter mentioned, to operate upon the molten metal in a receiver in the manner which I will now proceed to describe, the necessary heat being maintained in the molten iron or generated by the action upon it of the chemical agents employed without the aid of external heat continuously applied.

Much difficulty has hitherto been experienced in treating molten cast-iron with the view of removing impurities from it by the agency of infusible materials used for refining, such as oxides of iron, oxide of manganese, lime or limestone, and other purifying agents of a like nature, owing to the fact that when molten iron is poured into a receiver, in the bottom of which is deposited the required quantity of the purifying agent in a mass, the heat of the iron only acts upon a very thin layer, which cakes and forms a crust, and prevents the other part of the agents which are so covered from acting on the iron, and consequently a sufficient quantity of the purifying agent cannot be actively employed in connection with the molten iron, so as to have the necessary purifying effect.

The purifying and infusible or slowly fusible agent which I employ for the purpose is limestone, which is both cheap and efficient. Having well pulverized said material I mix with it, as a fusible material, soda-ash, which melts at a comparatively low temperature.

The fusible material, though it may not itself act with any practical effect in purifying the iron, is intimately mixed with the infusible or slowly fusible material and melts gradually away, and exposes constantly a fresh surface to the molten iron, instead of baking on its surface to a hard cake, as does the comparatively infusible purifying agent when used alone.

I am aware that fusible and infusible agents have before been employed in purifying or treating iron — as, for instance, in furnace where extraneous heat is continuously applied. In some cases, too, they have been tried in small quantities in receivers; but they have not been so employed with practical success, nor have they produced the beneficial results which I have succeeded in obtaining.

Now, the mode in which I treat the molten iron is as follows: I take ordinary pig-iron, either as it runs from the blast-furnace or when it is remelted in a cupola or other furnace, and I allow the molten metal to run into a receiver, which I make, of the required shape and dimensions, of wrought-iron lined with fire-brick.

The fusible and infusible agents specified, used in purifying the iron, I employ in large quantities for each charge of iron.

By employing a receiver made of considerable depth and allowing the molten metal to fall directly upon the surface of the purifying agents, I find that the metal itself keeps down the purifying agents below its surface a sufficient time to allow them to act properly without the assistance of any partition, or case, or vessel to separate the agents from the molten metal.

I also find that while I in all cases employ, as above mentioned, large quantities of the purifying agents, these quantities may be diminished in proportion as I employ receivers of increased depth to receive the molten metal, so that the purifying agents, as they rise from the bottom of the receiver up through the metal, have a longer distance to travel, and so have sufficient time to exhaust their energies and produce all the beneficial effect in purifying the iron of which they are capable.

When using the purifying agents in the proportions hereinafter mentioned, I have employed a receiver of a cylindrical shape, of about two feet diameter, and sufficiently deep to receive a charge of about two and one-half tons of iron upon the layer of purifying agents, which is previously placed at the bottom of the receiver.

The quantities of the purifying agents used are as follows: Having previously ascertained by analysis the composition of the iron to be treated, I employ, for the removal of every one per cent. of silicon from one ton of iron, forty pounds of soda-ash; forty pounds of limestone, or thereabout. These proportions I have successfully used when acting upon two and a half tons of molten iron, forming a column of metal about three feet six inches deep.

If a deeper column of metal were employed less materials would be required, as they are not fully exhausted by passing through three and a half feet of metal. If a shorter column were operated upon more chemicals would be necessary.

The mixture of soda-ash and limestone above mentioned I have found to be sufficient to remove all the sulphur usually found in ordinary iron. As an illustration of this, I found, when using the same quantity of the same purifying agents to act upon a larger quantity of the same metal—that is to say, upon three and a half tons in the same receiver—I, in this case, caused the agents to pass through a column of metal four feet nine inches deep, and I found that they, in this case, purified three and a half tons of metal to about the same degree as, with the lesser depth of metal, (three feet six inches,) they purified two and a half tons.

When using this mixture of limestone and soda-ash the slag formed is very stiff, and does not run easily out of the receiver after the iron. This can be altered by the addition of another base in the form of a little clay, oxide of iron, oxide of zinc, fluor-spar, or other such material, in order to form a more complex silicate, as a complex silicate is always more fusible than a simple silicate.

It will be found advantageous to employ, as being cheap and effectual, common yellow or any other clay, in the proportion of about one part, by weight, of clay to ten parts, by weight, of the mixture of limestone and carbonate of soda; and I generally add an extra one-half part of carbonate of soda to make sure of this mixture melting by the heat of the molten metal.

The quantity of the fusible agent may also be reduced when a decrepitating material—such as common rock or bay salt—is mixed with it; and a mixture formed of these decrepitating salts and non-fusible materials may be employed when only a small quantity of silicon has to be removed. The salt will disperse the powder and cause it to pass up through the iron when subjected to the heat of the molten iron; but I do not prefer them. However, for the sake of cheapness, it may sometimes be desirable to use such substances, as it is evident that the more the proportion of carbonate of soda is reduced the cheaper will be the mixture.

When employing the purifying agents above mentioned I employ a form of receiver that enables them to act efficiently. Those hitherto employed have been straight-sided, or, if anything, larger at the top than at the bottom. I find it more advantageous, in some cases, to make the receiver larger at the bottom than at the top, by means of which I expose a larger surface of purifying agents to the action of the iron; and, in order that skulls and slag may be easily removed, I make the bottom loose—that is, the bottom plate, upon which the receiver stands, is keyed up to an angle-iron flange fixed to the bottom end of the cylinder, and, when required for work, common loam is thrown in and rammed down, which will make it perfectly secure.

The receiver may, with advantage, be mounted on wheels or connected with a carriage, and, when charged with the purifying agent, may be placed under or in connection with a chimney, and be disconnected when the operation is complete.

Hydraulic machinery may be used for moving the receiver. Modifications of this apparatus also may be employed.

Having now described the nature of my improvements and the method of carrying them into effect, I would have it understood that I am aware that they, or many of them, have been tried before, but always in quantities or proportions that would prevent them being of practical use in purifying or refining molten iron when treated in a receiver in the manner proposed by me. I do not, therefore, make claim to the employment, generally, of the purifying agents mentioned; but

I claim—

The within-described process of purifying or refining molten cast-iron by treating it in a deep vessel, without extraneous heat, with pulverized limestone and soda-ash, mixed in or about the proportions herein specified, for the purpose set forth.

ARTHUR WARNER.

Witnesses:
J. G. TONGUE,
 34 *Southampton Buildings,*
  *Chancery Lane, London.*
H. J. CHRISTOPHERT,
 34 *Southampton Buildings,*
  *Chancery Lane.*